United States Patent Office 2,899,438
Patented Aug. 11, 1959

2,899,438

BENZOTHIAZOLYL-2-AMINO-1,4-DIHYDROXY ANTHRAQUINONE

Walter Jenny, Basel, Switzerland, assignor to Ciba Limited, Basel, Switzerland, a Swiss firm No Drawing. Application April 7, 1958
Serial No. 726,637

Claims priority, application Switzerland May 28, 1957

1 Claim. (Cl. 260—303)

This invention provides as new dyestuffs α-hydroxyanthraquinones which correspond to the formula (1) 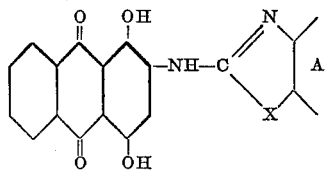

in which X represents an oxygen or sulfur atom or an imino group, and A represents a benzene radical. In the above formula X is advantageously a sulfur atom.

The invention also provides a process for the manufacture of the above new dyestuffs, wherein a 1:4-dihydroxy-2-amino-anthraquinone is condensed with a 2-halogen-benzoxazole or -benzimidazole, and advantageously a 2-halogen-benzthiazole.

Of special interest as starting materials are 2-chlorobenzthiazoles. These compounds may contain in the benzene radical substituents, for example, halogen atoms or alkoxy or alkyl groups.

The condensation is advantageously carried out at a raised temperature in the presence of a high boiling solvent, for example, phenol, nitrobenzene, chlorobenzene or naphthalene, and, if desired, with the addition of an acid-binding agent, for example, sodium carbonate or pyridine.

The new compounds of this invention are excellently suited, especially after a suitable pasting operation which may be combined with a precipitation treatment, for example, from sulfuric acid, for dyeing and printing structures and especially fibers of polyesters, for example, polyethylene terephthalate, which are known in commerce under the names "Terylene" and "Dacron." By the usual dyeing methods, for example, from a dye liquor containing a dispersion of the dyestuff, and advantageously a dispersing agent, at temperatures in the vicinity of 100° C., and, if desired, with the addition of a swelling agent or at a temperature above 100° C. under super- atmospheric pressure, there are obtained brilliant pink tints of excellent fastness to light and sublimation. The new dyestuffs also yield good reserves on wool and cotton.

The following examples illustrate the invention, the parts and percentages being by weight:

*Example 1*

5.1 parts of 2-amino-1:4-dihydroxyanthraquinone and 4.1 parts of 2-chloro-benzthiazole are stirred in 40 parts of phenol for 24 hours at 150–160° C., then the mixture is cooled to 70° C., 500 parts of alcohol are added, the whole is allowed to cool and is then filtered with suction. The filter residue is washed well with warm alcohol and dried at 60° C. in vacuo. The dyestuff is obtained in good yield in the form of a red powder which melts at 311–314° C., and in the form of a fine dispersion it dyes polyester fibers by the high temperature process or with the use of a swelling agent brilliant pink tints of excellent fastness to light and sublimation.

The 2-amino-1:4-dihydroxyanthraquinone used as starting material is a known compound and can be obtained as follows:

28.8 parts of 1:4-dihydroxyanthraquinone are heated in 3000 parts of water with 18 parts of hydroxylamine hydrochloride and 66 parts of an aqueous solution of caustic soda of 40% strength for 10 hours at 96–100° C. By slightly acidifying the mixture the resulting 2-amino-1:4-dihydroxyanthraquinone is precipitated, and then it is filtered off.

*Example 2*

1 gram of the dyestuff obtained as described in the first paragraph of Example 1 is pasted with 1.5 grams of sulfite cellulose waste liquor or dinaphthyl-methane disulfonic acid or a condensation product of a fatty alcohol with ethylene oxide, and the paste is diluted to a volume of 4000 cc. with water, and there are added, per liter of liquor, 1 cc. of acetic acid of 40% strength and 1 gram of a condensation product of a fatty alcohol with ethylene oxide. 100 grams of a yarn of polyester fibers are dyed in the resulting dyebath for ½ to 1 hour at 115–132° C., and a brilliant pink dyeing of excellent fastness to light and sublimation is obtained.

What is claimed is:
The anthraquinone dyestuff of the formula

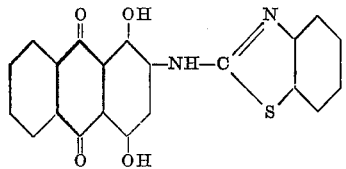

No references cited.